United States Patent [19]
Von Buren

[11] Patent Number: 5,411,392
[45] Date of Patent: May 2, 1995

[54] HEATED NOZZLE ASSEMBLY INCLUDING A HEATER CLAMP ARRANGEMENT

[75] Inventor: Stefan Von Buren, Toronto, Canada

[73] Assignee: Husky Injection Molding Systems Ltd., Bolton, Canada

[21] Appl. No.: 151,941

[22] Filed: Nov. 15, 1993

[51] Int. Cl.[6] .............................................. B29C 45/20
[52] U.S. Cl. ................................ 425/549; 264/328.15
[58] Field of Search ..................... 425/549; 264/328.15

[56] References Cited

U.S. PATENT DOCUMENTS 4,968,247 11/1990 Olson .................................. 432/225

Primary Examiner—Tim Heitbrink
Attorney, Agent, or Firm—Bachman & LaPointe

[57] ABSTRACT

An improved heater clamp arrangement for use in molding including a channel for transferring molten plastic, a sheet-like band heater around at least a portion of the channel means for heating the channel and molten plastic, and means placing continuous pressure on the band heater to urge same towards the channel in the hot and cold condition, as a sheet-like strip.

19 Claims, 3 Drawing Sheets

HEATED NOZZLE ASSEMBLY INCLUDING A HEATER CLAMP ARRANGEMENT

BACKGROUND OF THE INVENTION

The present invention relates to an improved heater clamp arrangement for use in an injection molding machine, especially in an injection molding machine of the hot runner type, particularly useful in securing a heater element in a desired position around a nozzle body for feeding liquified plastic to an injection gate of a mold cavity.

To maintain the fluidity of the resident plastic material during closure of the injection gate, enabling its use in a following molding cycle, it is desirable to form a terminal part of the sprue channel as an axial bore of a nozzle of good thermal conductivity closely surrounded by an electrical heating element. Some nozzle manufacturers go through costly processes to integrate heaters into the nozzle body. The primary disadvantage with this approach however is that should the heater get damaged the nozzle is lost as well. Thus, it is preferred that the heating element be removably mounted onto the nozzle body for ready replacement. One of the primary challenges associated with this technique is holding the heating element firmly against the external surface of the hot runner nozzle housing so as to maximize heater performance.

To obtain effective and efficient heat transfer from the heater to the heated part, it is necessary to have close contact between them. This is generally accomplished by use of a clamping device such as a metal shroud which encompasses the heater body and is screwed together at its ends to draw the heater tighter against the nozzle to be heated. This method has an advantage of being simple, using common tools such as a screw driver to tighten or loosen the heater. However, in cases where the heater must be installed in a confined area it can be difficult to access the screw head for tightening purposes once it is in its correct orientation in the molding machine. Typically, the obstruction is the mold plate adjacent to and surrounding the heater. In such cases, additional clearance is often machined into the plate to permit the tightening tool to reach the screw head.

In situations where it is prohibitive to add clearance machining because it will compromise the strength of the mold plate or reduce the plate material available to back-up and support other mold components, a design as shown in U.S. Pat. No. 4,968,247, issued Nov. 6, 1990, permits tightening of the heater by way of a cam actuated clamp housing. This design permits a tool to approach from the axial direction of the heater, thus requiring no special clearance for the tightening tool. While this is an improvement for ease of assembly and structural integrity of the mold plate, there is still the need to cut a small pocket of clearance for the cam mechanism which stands outside of the cylindrical profile of the outer surface of the heater. Likewise there is a variety of other tightening devices available for use on the market, which also invariably add substantially to the outer diameter of the heater.

Some coil heaters on the market have no external clamping mechanism but use the spring nature of the coil to hold its position on the nozzle. By design, the element must be heavy (thick) and stiff, to maintain its size, shape and gripping ability. Thus, it can be difficult to install or remove in a confined space or without special tools.

Clampless heaters show no clamp mechanism at all, but instead rely on an extremely precise fit between the heater and the nozzle, thus requiring no extra clearance other than for the outer diameter of the heater. Aside from the high cost of manufacturing both fitting diameters, there are additional drawbacks, for example, it can become necessary to engineer additional devices to trap the heater on the nozzle to prevent it from slipping axially away from its installed position during handling or movement of the mold. These heaters also tend to have a thick wall section, in the order of 4 mm for heaters with a 12-42 mm internal diameter. Also, should any burrs or surface imperfections exist on the mating surfaces the heater can seize on the nozzle and become very difficult to remove without damage to the heater or the nozzle.

It would be highly desirable to provide a simple, cost effective way to clamp a heater to an injection molding nozzle or other channel means for transferring molten plastic while increasing the outer diameter of the channel means as little as possible. Accordingly, this is the principal objective of the present invention.

A further object of the present invention is to provide an improved heater clamp arrangement as aforesaid which is easy and convenient to use in a confined area with little space and which is operative to clamp the heater to the channel means in the hot or cold condition.

Further objects and advantages of the present invention will appear hereinbelow.

SUMMARY OF THE INVENTION

In accordance with the present invention, the foregoing objects and advantages are readily obtained.

The improved heater clamp arrangement of the present invention for use in an injection molding machine comprises: channel means for transferring molten plastic; a sheet-like band heater around at least a portion of said channel means for heating said channel means and molten plastic; and means, preferably a spring-like material as a sheet-like strip, placing continuous pressure on said band heater to urge same towards the channel means in the hot or cold condition.

In the preferred embodiment, the channel means is an injection molding nozzle, but other components of the injection molding machine may be used wherever a channel means is desired to transfer molten plastic, as the hot runner channel or transfer channels.

The heater has an outside surface and an inside surface. Preferably the sheet-like strip engages the outside surface, surrounds at least a portion thereof and places the heater under continuous tension and presses the heater towards the channel means. The channel means is a generally cylindrical member with an outside diameter, with the heater and sheet-like strip also being generally cylindrical members which at least partly surround the outside diameter of the channel means.

The sheet-like strip is preferably a metal strip from 0.1-4 mm. thick, made from high carbon spring steel.

The heater includes leads extending therefrom and the sheet-like strip includes a gap wherein the leads extend through the gap.

The sheet-like strip should have a diameter smaller than the diameter of the heater and preferably surrounds the heater to place the heater under continuous tension. However, in an alternate embodiment, the sheet-like strip may be secured to the inside diameter of the heater, as by welding, and thereby place the heater under tension to pull same towards the channel means.

The nozzle is generally positioned in at least one plate, as in a mold plate and/or backing plate, and spaced therefrom, with the heater and sheet-like strip positioned in the space between the nozzle and plate. The instant invention provides a simple, cost effective way to clamp the heater to the channel means, while increasing the outside diameter of the channel as little as possible. The design preferably comprises a low profile mica band with spring-like characteristics that practically covers the entire outer surface of the heater. Sliding the heater onto a nozzle by hand or with conventional snap-ring pliers is simple as there are no coils to get hung up or unraveled. A further advantage over a coil heater is the inherent unheated area at the split of the heater band. In nozzles where an eccentrically located melt channel is employed, it can be positioned directly over a melt channel in the nozzle, preventing local overheating of the plastic melt. The spring-clip has been determined to be effective at only a fraction of the heater wall thickness, resulting in a very compact overall assembly. The heater can easily be installed and removed any number of times with no concern of damage and the manufacturing tolerances of the fitting diameters is substantially more liberal. A further advantage of the instant invention is that mold plate machining time is minimized, as a simple rough bored hole is all that is required to provide ample clearance.

Further objects and advantages of the present invention will appear hereinbelow.

BRIEF DESCRIPTION OF THE DRAWINGS

The present invention will be more readily understandable from the following illustrative drawings in which.

DETAILED DESCRIPTION OF PREFERRED EMBODIMENTS

Figure 1:
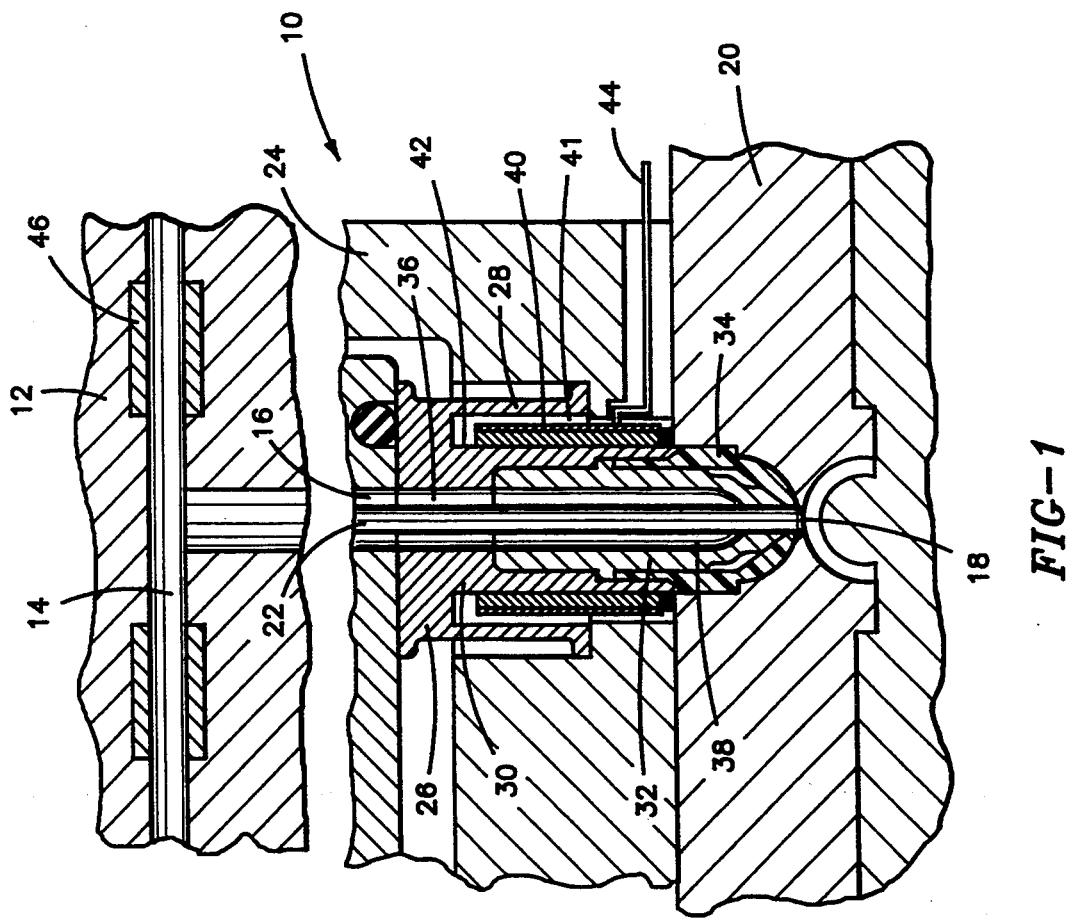
FIG. 1 is a cross-section view of an arrangement according to the present invention with portions cut away.

Referring now to the figures, FIG. 1 illustrates part of a hot runner structure 10 serving to supply liquified thermoplastic resin from a pressure chamber (not shown) via a hot runner 12 including a hot runner channel 14 to transfer channel 16 to an injection gate 18 of a mold plate 20. The gate 18 is alternately opened and closed by a rod or pin 22 connected to a double-acting piston (not shown). The piston for operating the rod or pin does not form part of the present invention and may be any suitable piston known in the art for actuating such a valve rod. Alternatively, the gate may not use a rod but rather rely on thermal separation for the opening and closing thereof.

A cooled intermediate or backing plate 24 is inserted between the mold plate 20 and the hot runner 12. The backing plate 24 supports a nozzle 26 provided with an annular skirt 28 surrounding a tubular nozzle body 30. The nozzle 26 including the skirt portion 28 and the nozzle body portion 30 is formed from a material having good thermal conductivity. The tubular nozzle body 30 forms part of the hot runner system for supplying liquified plastic material to the injection gate 18. A nozzle tip 32 formed from a highly heat-conductive material, such as beryllium/copper, is seated in the nozzle body 30 and extends into the mold plate 20 as a guide for the free end of the valve rod 22. An annular space existing between the end of the nozzle body 30, the tip 32 and the mold plate 20 is occupied by a sheath 34 of resinous material. This sheath may be prefabricated or may be formed from the overflow of injected resin in the first operating cycle or cycles. The sheath 34 serves primarily as a thermal insulator.

As shown in FIG. 1, the tubular body 30 has an axial channel 36 or upper nozzle channel which forms part of the transfer channel 16 from hot runner channel 14 into gate 18 through which molten plastic material is conveyed from the source (not shown) to the gate 18. The tip 32 also has a channel 38 or lower nozzle channel that forms part of the transfer channel 16 for conveying the molten plastic material to the gate 18.

When the gate 18 is closed by the rod 22, molten plastic material will reside in the channels 36 and 38. To keep this plastic material in a liquified state, a heater 40 is provided around a portion of the nozzle body 30. The heater 40 is positioned within a space 41 defined by the skirt 28, the backing plate 24 and the nozzle body 30 and is in contact with the outer surface 42 of the nozzle body 30. An electrical cable 44 passes through a passageway in the backing plate and is connected to the heater 40 so that electrical power may be provided thereto.

In addition, in order to keep the plastic in a liquified state in the hot runner channel or in other channel means running from the pressure chamber, heaters 46 may be provided around hot runner channel 14 as shown in FIG. 1, with heaters 46 substantially the same construction as heaters 40.

Figure 2:
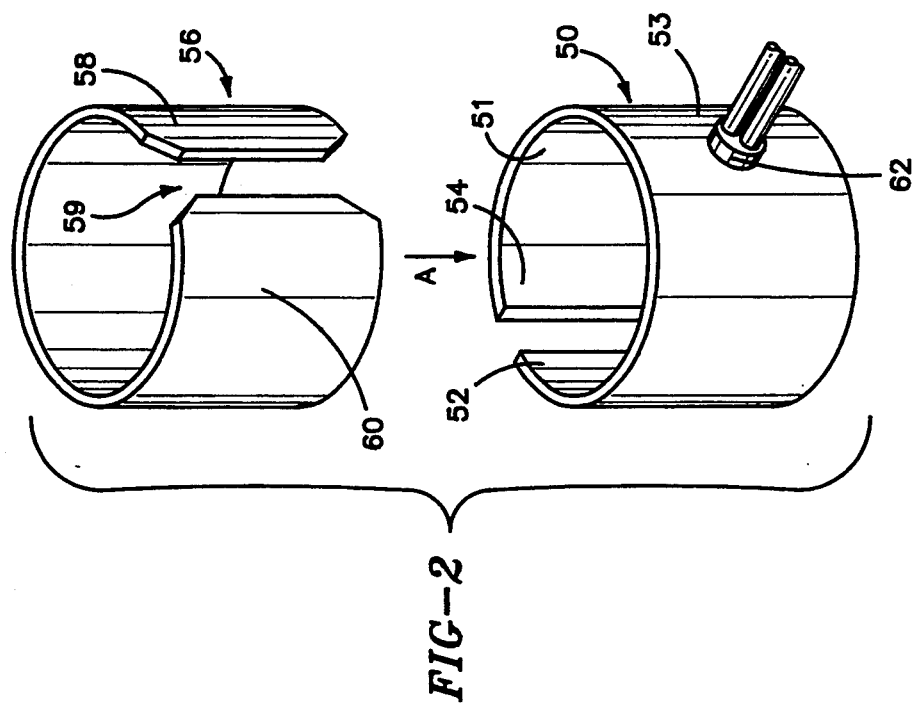
FIG. 2 is a side view of the hand heater and sheet-like strip separated from each other.

The heater 40 or 46 is a sheet-like band heater 50 as shown in FIG. 2 which is formed into the desired shape, as the annular configuration shown, depending on the shape of the channel means. The annular shaped heater 50 has an inside surface 51 and an outside surface 53. Preferably ends 52 and 54 thereof are spaced apart to leave an open space therebetween to permit compression thereof by the sheet-like strip 56, placed over heater 50 in the direction of arrow A to engage the outside surface 53 of heater 50 and/or to provide an unheated portion which may be desirable in some applications. The heater 50 should be substantially planar, as a mica heater, and is preferred to be relatively thin and compliant under the spring-clip pressure of strip 56 to insure good contact with the heated part. However, foil-type heaters may also be used. Thus, the heater may have a thickness of 0.1–20 mm. and preferably 2–4 mm.

Figure 3B:
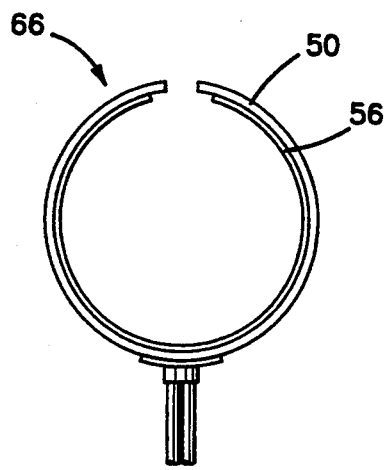
FIGS. 3A and 3B are top views of the band heater and sheet-like strip assembled together.
Figure 3A:
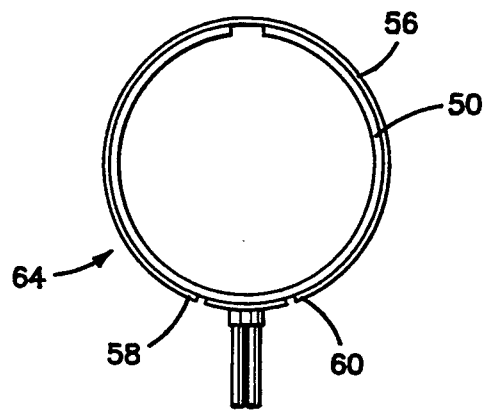

Strip 56 may be made from any suitable sheet metal material which exhibits spring-like characteristics, i.e., which places continuous pressure on the adjacent heater to urge same towards the channel means in the hot or cold condition. High carbon spring steel in sheet metal form is particularly suitable. It is cut to a suitable shape as shown in FIG. 2 and is then formed into a circular shape using a forming tool and it can be hardened and tempered afterwards. Hardness in the range of 42–46 Rockwell C is preferred. The heater is generally thicker than the sheet-like strip, with the sheet-like strip having a thickness range of 0.1–4 mm. and generally 0.2–1 mm., although of course this can be varied to suit the strength of spring required for the heater. Naturally, alternative materials can be used to aid corrosion protection, fatigue strength, extreme heat, etc., as needed for the specific application. The sheet-like strip or clip exhibits continuous pressure on the heater and may continuously contact the heater along the entire surface thereof. However, other configurations may be used, as the clip may completely surround the heater and overlap itself. Also, as shown in FIG. 2, ends 58 and 60 of clip 56 may be spaced from each other to leave a gap 59 therebetween which permits wire or lead 62 from heater 50 to exit as shown in FIG. 3A. Naturally, the spring-like clip 56 is preferably formed into a diameter smaller than heater 50 so as to exert continuous tension therearound and to apply a preload to the heater for a secure assembly.

FIG. 3A shows the assembled unit 64 with clip 56 surrounding heater 50. Alternatively, clip 56 may be affixed to the inside surface 51 of heater 50 as shown in the assembled unit 66 in the embodiment of FIG. 3B, as by welding or forming tabs which grip the heater to pull same inwards towards the channel means.

Figure 4:
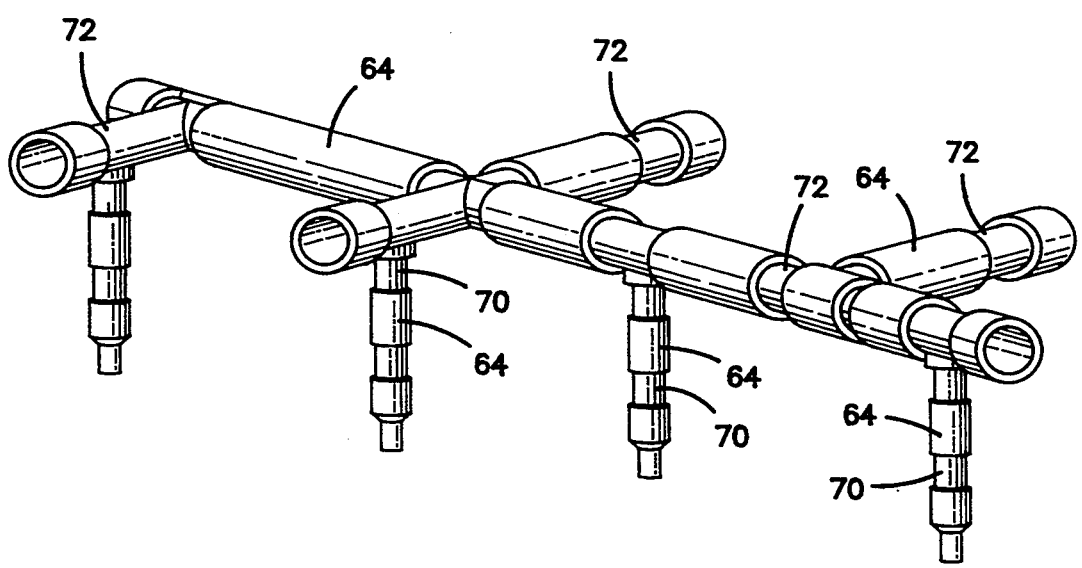
FIG. 4 is a perspective view of the hot runner and nozzle channels with assembled heater arrangements separated from other mold components.

The heater-clamp arrangement of the present invention may effectively be employed on any channel means from a source of molten plastic to the injection gate. Thus, as shown in FIG. 4, heating clamp unit 64 may be placed around injection nozzle 70 or hot runner channel 72. If convenient, a plurality of shorter pieces of the heater-clamp arrangement may be used, or a longer assembly. In addition a single heater unit may have a plurality of clips affixed thereto.

Figure 5A:
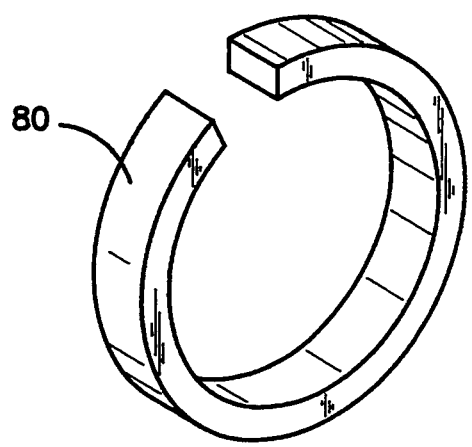
FIGS. 5A, 5B and 6 are alternate embodiments of the means for placing continuous pressure on the heater.
Figure 5B:
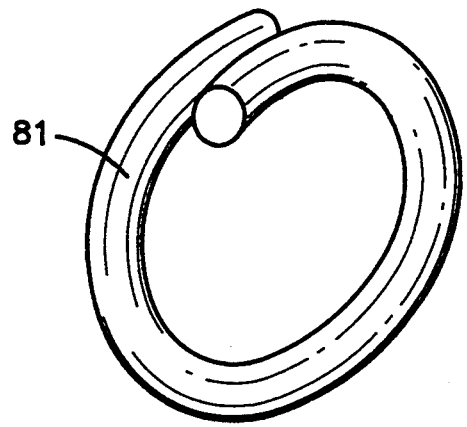
Figure 6:
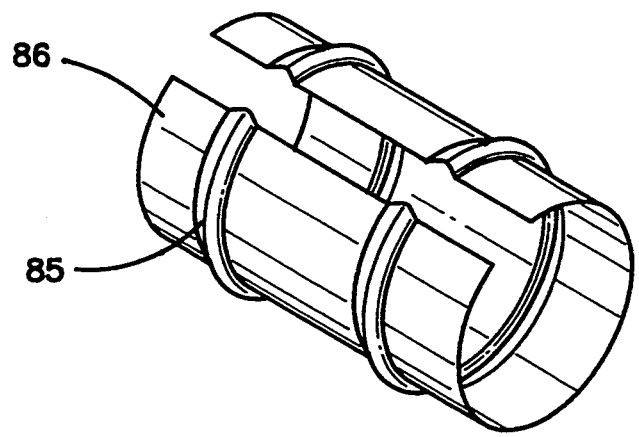

The means placing continuous pressure on the heater may be a bar or rod, such as bar 80 shown in FIG. 5A or rod 81 shown in FIG. 5B. These may be used as in the previous embodiments, as simply wrapped around the heater in a manner after FIG. 3A. Alternatively, one may form the sheet-like strip with ribs 85 on strip 86 shown in FIG. 6 to provide additional rigidity to the sheet-like strip.

As a further alternative, one may construct the heater of material providing spring-like characteristics to operate to place continuous pressure on the heater without a separate clip-like component and to urge same towards the channel means, i.e., the improved heater-clamp arrangement of the present invention may be a monolithic spring-like heater made of, for example, high carbon spring steel with the spring steel construction continuously urging the heater towards the channel means.

As a further alternative, the spring-like material may be laminated to the heater as the inside or outside diameter thereof, as in the form of a composite laminate.

Thus, the assembly of the present invention is easy to install, has a low profile enabling more compact design possibilities, involves less mold plate machining, has stronger mold plate and support capabilities, a possible unheated portion, and represents a low cost heater clamp device with efficient heat exchange capabilities.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A heated nozzle assembly for use in plastic molding, including: a nozzle having a channel means for transferring molten plastic; an electrically activated, band heater having an outside diameter around at least a portion of said nozzle for heating said channel means and said molten plastic; and means adjacent said band heater placing continuous pressure on said band heater to urge said band heater towards said nozzle, said continuous pressure means comprised of a material which exhibits spring characteristics, formed with a diameter less than the outer diameter of said heater, and such that said continuous pressure means places continuous pressure on said heater to urge the heater towards said nozzle when the heater is electrically activated or deactivated.

2. Assembly according to claim 1 wherein said continuous pressure means is in the form of a strip.

3. Assembly according to claim 1 wherein said continuous pressure means is in the form of a bar.

4. Assembly according to claim 1 wherein said continuous pressure means is in the form of a rod.

5. Assembly according to claim 1 wherein the material of construction of the spring is high carbon spring steel.

6. Assembly according to claim 1 wherein said channel means is a hot runner channel.

7. Assembly according to claim 1 wherein said heater has an inside surface and an outside surface, and wherein the continuous pressure means engages the outside surface, surrounds at least a portion thereof, places the heater under continuous tension and presses the heater towards the channel means.

8. Assembly according to claim 7 wherein the heater and continuous pressure means have a generally annular shape.

9. Assembly according to claim 8 wherein the channel means is a generally cylindrical member, with the heater at least partly surrounding said channel means.

10. Assembly according to claim 2 wherein said strip is a metal clip.

11. Assembly according to claim 10 wherein said clip is high carbon spring steel.

12. Assembly according to claim 11 wherein said clip is 0.1–4 mm. thick and said heater is greater than 0.1 mm and at most 20 mm. thick, and the heater is thicker than the clip.

13. Assembly according to claim 10 wherein the heater includes leads extending therefrom and the continuous pressure means includes end portions spaced from each other to form a gap with the leads extending through the gap.

14. Assembly according to claim 1 wherein the continuous pressure means continuously contacts the heater along a surface of the heater.

15. Assembly according to claim 1 wherein the heater has end surfaces spaced apart to leave an open space therebetween to permit compression of said end surfaces by said continuous pressure means.

16. Assembly according to claim 1 wherein the continuous pressure means is operative to place continuous pressure on the heater solely based on the material of the continuous pressure means.

17. A heated nozzle assembly for use in plastic molding, including: a nozzle having a channel means for transferring molten plastic; an electrically activated, band heater having an outside diameter around at least a portion of said nozzle for heating said channel means and said molten plastic; and means adjacent said band heater placing continuous pressure on said band heater to urge said band heater towards said nozzle, said continuous pressure means comprised of a material which exhibits spring characteristics, formed with a diameter less than the outer diameter of said heater, and such that said continuous pressure means places continuous pressure on said heater to urge the heater towards said nozzle when the heater is electrically activated or deactivated, and wherein said continuous pressure material includes strengthening ribs.

18. A heated nozzle assembly for use in plastic molding, including: a nozzle having a channel means for transferring molten plastic; an electrically activated, band heater having an outside diameter around at least a portion of said nozzle for heating said channel means and said molten plastic; and means adjacent said band heater placing continuous pressure on said band heater to urge said band heater towards said nozzle, said continuous pressure means comprised of a material which exhibits spring characteristics, formed with a diameter less than the outer diameter of said heater, and such that said continuous pressure means places continuous pressure on said heater to urge the heater towards said nozzle when the heater is electrically activated or deactivated, and wherein the heater has an inside surface and an outside surface, wherein the continuous pressure means engages the inside surface and is secured thereto and places the heater under tension to pull said heater towards the channel means.

19. Arrangement according to claim 18 wherein the heater and continuous pressure means have a generally annular shape with the heater surrounding the continuous pressure means and wherein the continuous pressure means has a smaller diameter than the heater.

* * * * *